UNITED STATES PATENT OFFICE.

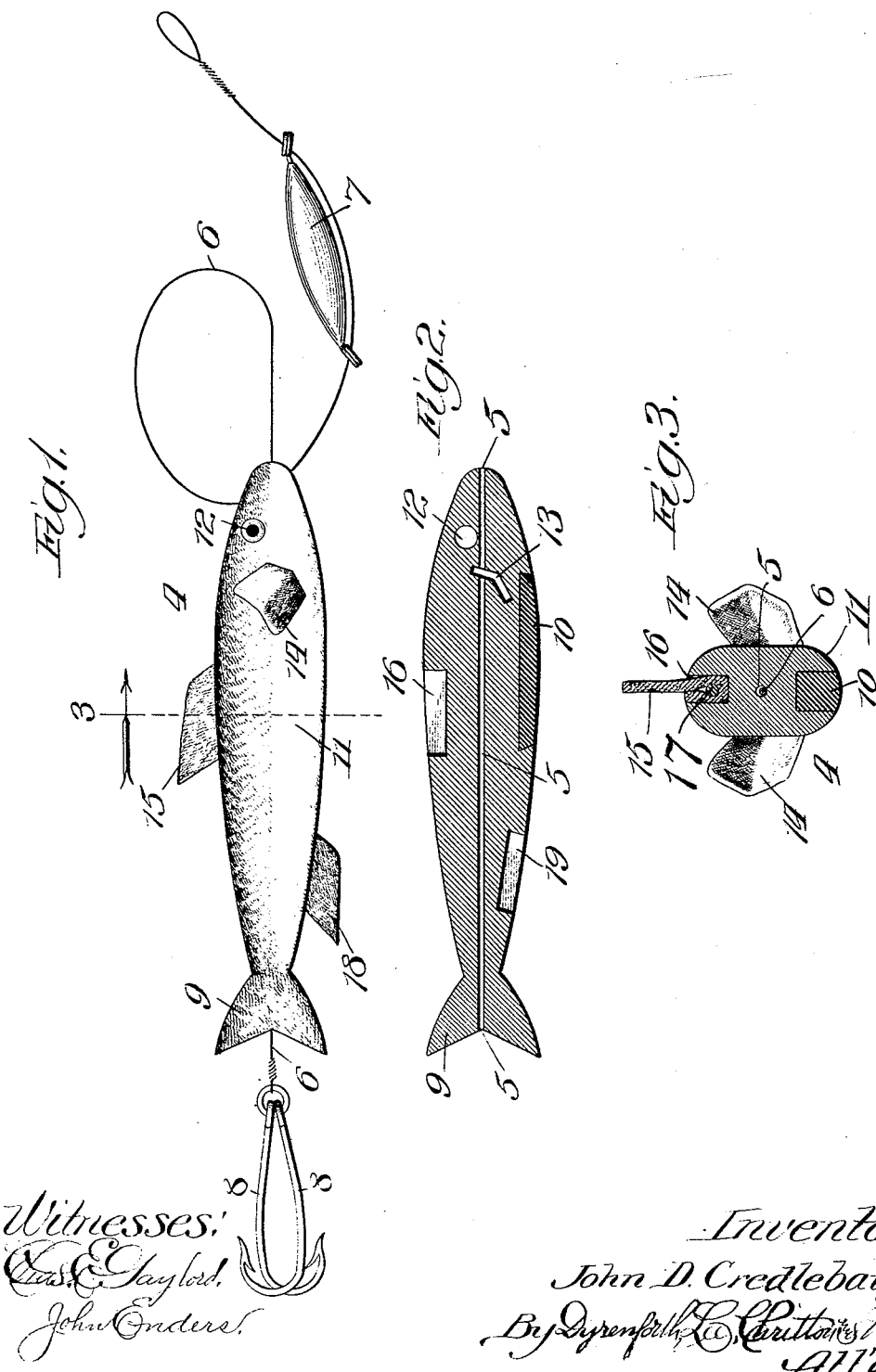

JOHN D. CREDLEBAUGH, OF CHICAGO, ILLINOIS.

ARTIFICIAL FISH-BAIT.

No. 865,683.          Specification of Letters Patent.          Patented Sept. 10, 1907.

Application filed July 1, 1907. Serial No. 381,587.

*To all whom it may concern:*

Be it known that I, JOHN D. CREDLEBAUGH, a citizen of the United States, residing at Chicago, in the county of Cook and State of Illinois, have invented a new and useful Improvement in Artificial Fish-Bait, of which the following is a specification.

The object of my invention is to provide an artificial fish-bait adapted to sink to suitable depth in the water, which shall closely resemble in appearance and action in the water a bait-fish, such as a minnow, and, besides, furnish a highly attractive bait.

In the accompanying drawing, Figure 1 shows my improved bait in the swimming position it assumes as a fish in the water, with the line passing longitudinally through it and carrying fish-hooks on its rear end; Fig. 2 shows the bait by a view in longitudinal sectional elevation, and Fig. 3 is a section taken at the line 3 on Fig. 1 and viewed in the direction of the arrow.

The bait 4 is in the form of a suitable fish, such as a minnow, and is preferably made of light wood, though other suitably light material may be used; and extending longitudinally and centrally through the body of the bait is an opening 5 for the passage of the line 6, shown to contain a sinker 7 quite far in advance of the front end of the bait and to be provided with hooks 8 on its end behind the tail 9, which may be rigid and should be brightly colored, as red, or it may be flexible like the fins, hereinafter described.

To cause the body of the bait to sink in the water to a proper depth and be poised therein in upright position, meaning the position maintained by a live fish in swimming, the body is weighted by countersinking in it along its lower portion metal, such as lead 10, to extend from near the forward end of the body lengthwise for some distance backward in the same, and the body is covered, as to the portion thereof below the back, with tin-foil 11, or some other suitably glistening material, in resemblance of scales to enhance the attractiveness of the bait. Adjacent to the eye 12, an irregular opening 13, of the angular shape shown, or of rounded or crescent shape, is formed transversely through the body of the bait, and through this opening is passed, to be confined by its irregular shape, a strip of bright-colored flexible material, preferably red flannel, to protrude beyond the sides of the head as fins 14 in resemblance to the gill-fins of a fish. Similar flexible material is provided to form the back fin 15, in resemblance to the back-fin of a fish, being confined in a recess 16 in the back of the body, as through the medium of a pin 17; and similar flexible material is used to form the rear under fin 18, in resemblance to the corresponding fin of a fish, being confined in a recess 19 in the body 4 in the same way that the fin 15 is confined.

The construction thus described, forming my improved artificial fish-bait, renders it highly efficient for its purpose, as has been demonstrated by its actual use: The weight 10, which may vary in gravity according to the size of the bait and other conditions, for sinking the bait to the proper depth in the water, by poising it in the upright position therein, enhances its resemblance to the live article; and this resemblance is added to by the provision of the flexible fins, which vibrate in the water, and by the scale-simulating covering 11, the brightness of which, and of the fins and tail add to the function of the bait of attracting fish to it. When a fish strikes the bait in the attempt to swallow it, finding it to be unpalatable, the fish ejects it but is caught by the hooks 8, with which it runs, carrying the line through the opening 5, thus without carrying the bait with it. This is of advantage, since unless provision were made for drawing the line through the bait, the latter could not be ejected by the fish when caught by the hooks, and would tend to strangle and drown it. Moreover, the line passes through the material 14 to prevent the possibility of its withdrawal, and may, obviously, pass through the other fin-material and tail, for the same purposes.

What I claim as new, and desire to secure by Letters Patent, is—

1. Artificial fish-bait comprising a body in the form of a fish, provided on its under side with a weight for sinking and poising it in the water, and having fins or bright-colored material of a character so flexible as to adapt it to be vibrated by movement of the bait in the water.

2. Artificial fish-bait comprising a body in the form of a fish, provided on its under side with a weight for sinking and poising it in the water, and with a transverse irregular opening in its head-portion, bright-colored flexible material confined in said opening and forming the gill-fins of the bait, and similar material on the body forming the back and rear fins.

3. Artificial fish-bait comprising a body in the form of a fish, provided on its under side with a weight for sinking and poising it in the water, and having fins of bright-colored material of a character so flexible as to adapt it to be vibrated by movement of the bait in the water, and a bright-colored tail.

4. Artificial fish-bait comprising a body in the form of a fish, provided on its under side with a weight for sinking and poising it in the water, and having fins and a tail of bright-colored material of a character so flexible as to adapt it to be vibrated by movement of the bait in the water.

5. In combination, artificial fish-bait comprising a body in the form of a fish, having an opening extending longitudinally through it and provided with a weight on its under side for sinking and poising it in the water and with fins of bright-colored material of a character so flexible as to adapt it to be vibrated by movement of the bait in the water, and a line extending through said opening and freely movable longitudinally through said body, with a hook on the line at the tail-end of the bait.

6. Artificial fish-bait comprising a body in the form of a fish, provided on its under side with a weight for sinking and poising it in the water and with a covering of glistening material in resemblance of scales and having fins of bright-colored material of a character so flexible as to adapt it to be vibrated by movement of the bait in the water, and a bright-colored tail.

7. Artificial fish-bait comprising a body in the form of a fish, weighted to adapt it to sink and poise in the water and provided with a transverse irregular opening in its head-portion having bright-colored material, such as red flannel, confined in it and forming flexible gill-fins, a recess in its back-portion containing similar material forming the back-fin, and a recess in the under side near the tail-portion containing similar material forming a fin.

8. Artificial fish-bait comprising a body in the form of a fish, weighted to adapt it to sink and poise in the water and provided with a longitudinal central opening for the line, with a transverse irregular opening in its head-portion having red flannel, or the like, confined in it and forming flexible gill-fins, a recess in its back-portion containing similar material forming the back-fin, and a recess in the under side near the tail-portion containing similar material forming a fin.

JOHN D. CREDLEBAUGH.

In presence of—
J. H. LAUDES,
W. B. DAVIES.